US008374950B1

(12) United States Patent
May (10) Patent No.: US 8,374,950 B1
(45) Date of Patent: Feb. 12, 2013

(54) USER INTERFACES FOR EFFICIENT TRADE ENTRY AND MANAGEMENT

(75) Inventor: Richard Raymond May, Matthews, NC (US)

(73) Assignee: ICAP Services North America LLC, Jersey City, NJ (US)

( * ) Notice: Subject to any disclaimer, the term of this patent is extended or adjusted under 35 U.S.C. 154(b) by 434 days.

(21) Appl. No.: 12/364,091

(22) Filed: Feb. 2, 2009

Related U.S. Application Data

(62) Division of application No. 11/291,465, filed on Nov. 30, 2005.

(51) Int. Cl.
*G06Q 40/00* (2012.01)
(52) U.S. Cl. ............................ 705/37; 705/36 R; 705/35
(58) Field of Classification Search ................... 705/37, 705/35
See application file for complete search history.

(56) References Cited

U.S. PATENT DOCUMENTS

| 5,077,665 | A | 12/1991 | Silverman et al. |
| 5,136,501 | A | 8/1992 | Silverman et al. |
| 5,375,055 | A | 12/1994 | Togher et al. |
| 5,809,483 | A | 9/1998 | Broka et al. |
| 6,014,627 | A | 1/2000 | Togher et al. |
| 6,317,727 | B1 | 11/2001 | May |
| 6,408,282 | B1 | 6/2002 | Buist |
| 6,421,653 | B1 | 7/2002 | May |
| 6,519,574 | B1 | 2/2003 | Wilton et al. |
| 6,615,188 | B1 * | 9/2003 | Breen et al. ..................... 705/37 |
| 7,613,640 | B2 | 11/2009 | Horsfall |
| 7,734,533 | B2 | 6/2010 | Mackey, Jr. et al. |
| 2003/0055776 | A1 * | 3/2003 | Samuelson ..................... 705/37 |
| 2003/0088499 | A1 | 5/2003 | Gilbert et al. |
| 2003/0088509 | A1 * | 5/2003 | Wilton et al. ................... 705/37 |
| 2004/0148244 | A1 | 7/2004 | Badeau et al. |
| 2005/0149428 | A1 * | 7/2005 | Gooch et al. .................... 705/37 |

* cited by examiner

*Primary Examiner* — James Vezeris
(74) *Attorney, Agent, or Firm* — Dickstein Shapiro LLP (57) ABSTRACT

A plurality of user interfaces for facilitating efficient order management and post-trade processing in an electronic trading system are disclosed. A first user interface comprises a plurality of client buttons and a broker button. Selection of a client button shifts the user interface to a client-perspective mode in which all actions and views are from the selected client's point of view. Selection of the broker button shifts the user interface to a client-neutral mode in which the broker may enter orders in the market without specifying any particular client. An analogous user interface for use by a trader is also described. A second user interface, referred to as a blotter, is also provided that comprises four distinct views for displaying "pending," "completed," "all," and "annulled" trades. Preferred embodiments for utilizing the disclosed user interfaces to process different classes of pending trades are also described.

13 Claims, 7 Drawing Sheets

| Cod | C/P | Counterparty | Buy | | | | | | Sell | | | | | |
|---|---|---|---|---|---|---|---|---|---|---|---|---|---|---|
| | | | NC | CL | PC | N | Limit | Credit | NC | CL | PC | N | Limit | Credit |
| HSBN | ABNC | ABN AMRO BANK NV CHICAGO | ☒ | ☐ | ☐ | ☐ | | | ☒ | ☐ | ☐ | ☐ | | |
| HSBN | AIGY | AIG INTERNATIONAL, INC. NEW YORK | ☐ | ☐ | ☒ | ☐ | | | ☐ | ☐ | ☒ | ☐ | | |
| HSBN | BAJL | BANCO DEL BAJIO, S.A. | ☐ | ☐ | ☐ | ☒ | | | ☐ | ☐ | ☐ | ☒ | | |
| HSBN | BANS | BANSI, S.A. | ☐ | ☒ | ☐ | ☐ | | | ☐ | ☒ | ☐ | ☐ | 10,000,000 | 5,000,000 |
| HSBN | BARN | BARCLAYS BANK LONDON PLC, NEW YO | ☒ | ☐ | ☐ | ☐ | | Detail | ☒ | ☐ | ☐ | ☐ | | |
| HSBN | BBVM | BBVA BANCOMER MEXICO CITY | ☒ | ☐ | ☐ | ☐ | | Modify limit | ☒ | ☐ | ☐ | ☐ | | |
| HSBN | BCXM | BANCO NACIONAL DE COMERCIO EXT | ☒ | ☐ | ☐ | ☐ | | Modify balance | ☒ | ☐ | ☐ | ☐ | | |
| HSBN | BERN | BEARN STEARNS NEW YORK | ☒ | ☐ | ☐ | ☐ | | Delete | ☒ | ☐ | ☐ | ☐ | | |

USER INTERFACES FOR EFFICIENT TRADE ENTRY AND MANAGEMENT

CROSS-REFERENCE TO RELATED APPLICATION

The present application is a divisional of application Ser. No. 11/291,465, filed Nov. 30, 2005.

BACKGROUND OF THE INVENTION

Historically, transactions in many financial markets were conducted via third-party intermediaries known as "voice brokers" who would take orders to buy and sell financial instruments over the telephone and match those orders to execute a transaction. More recently, however, these markets have seen the introduction of numerous electronic trading systems that permit principals to directly enter buy and sell orders and match those orders with no human intervention. Such systems are currently in use in markets for many classes of financial instruments including stocks and bonds, as well as markets in which transactions result in a bi-lateral contract representing a financial instrument (e.g., foreign exchange, loans, and OTC derivatives). These latter markets present special implementation challenges because electronic trading systems used in such markets must include a mechanism for confirming that the credit risk associated with any given transaction is acceptable to both parties before completing a transaction.

The proliferation of electronic trading systems, however, has not completely removed the need for voice brokers. Rather, the voice broker has survived and continues to play an important role in certain trade execution and credit risk transfer processes, even as to transactions conducted via electronic trading systems. Human brokers provide certain advantages particularly with respect to transactions in illiquid markets or those where a large size is demanded or where credit between potential counterparties is inadequate. Because human brokers are often called on to execute some of these more challenging transactions, and because they often concurrently represent multiple clients with differing market positions, there is a need for specialized broker user interfaces that facilitate the managed trading of financial instruments via electronic trading systems. Moreover, there is a general need for improved user interfaces that facilitate and render more efficient order management and post-trade processing by both brokers and dealers. The present invention is directed to providing such improved user interfaces.

SUMMARY OF THE INVENTION

The present invention provides a plurality of user interfaces for facilitating efficient order management and post-trade processing in an electronic trading system. In a preferred embodiment, a broker user interface is provided that comprises a plurality of client buttons and a broker button. Selection of a client button causes the user interface to shift to a client-perspective mode in which all actions and views are from the selected client's point of view. Selection of the broker button causes the user interface to shift to a client-neutral mode in which the broker may enter orders in the market without specifying any particular client. The preferred user interface also comprises market-detail, market-summary, first order-entry, second order-entry, and dialog windows particularly adapted to facilitate order entry and management by a trader. An analogous user interface for use by a trader, is also described without the client or broker buttons included in the broker user interface.

In a preferred embodiment, a second user interface, referred to as a blotter, is also provided that comprises four distinct views labeled "Pending," "Completed," "All," and "Annulled." The "Pending" view displays those trades entered by a user or processed electronically that require further action to be completed. The "Completed" view displays all completed trades for a given trade date. The "All" view displays all pending and completed trades. The "Annulled" view displays trades that have been cancelled. Broker and trader embodiments of the blotter user interface are described below with functionality specifically adapted to their respective trading needs.

In a preferred embodiment, the disclosed user interfaces facilitate the processing of a number of different classes of pending transactions, including "name-check" transactions where a buy and sell order are matched but at least one party to the transaction must approve its proposed counterparty before the transaction can be completed; "name-pending" transactions in which a broker may enter an order without initially specifying a client name with the understanding that the broker will later provide a suitable counterparty to the party with whom he or she traded; "modified-registered" transactions in which one party to a transaction indicates that it wishes to modify some aspect of the transaction; and "annulled-pending" transactions in which one party to a completed transaction indicates that it wishes to cancel the transaction.

DETAILED DESCRIPTION OF THE PREFERRED EMBODIMENTS

Figure 1:
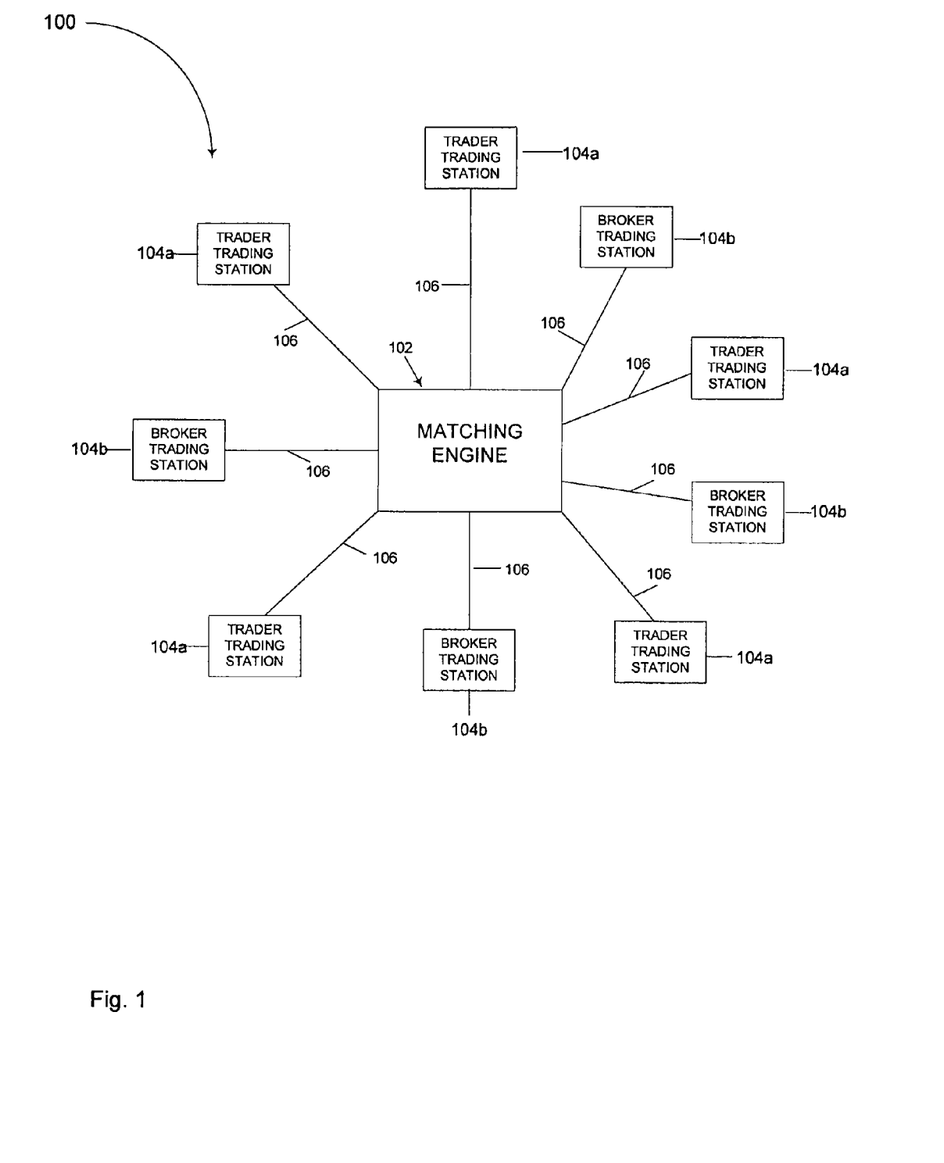
FIG. 1 is a block diagram depicting aspects of a preferred embodiment of the present invention.

With reference to FIG. 1, there is shown a system 100 comprising a matching engine 102 and a plurality of trading terminals 104 connected via appropriate communication links 106. Matching engine 102 is preferably adapted to receive orders to buy and sell financial instruments from terminals 104, to process trading orders in accordance with specified protocols, and to communicate market information concerning trading activity to terminals 104, as described in more detail below.

Matching engine 102 preferably comprises one or more server computers and associated components programmed to implement the trading activity. Each terminal 104 may preferably be a computer workstation comprising a CPU, memory, a display, and input devices, such as a mouse, keyboard, or specialized trading keypad. In the embodiment of FIG. 1, some terminals 104b are provided to brokers for entry of buy and sell orders on behalf of customers, while other terminals 104a are provided to customers for direct entry of buy and sell orders on their own behalf. In some embodiments, all brokers working at broker terminals 104b may be employed by a single brokerage firm. In other embodiments, brokers working at different terminals 104b may be employed by different brokerage firms. Communication links 106 may comprise any appropriate arrangement of wired or wireless communication lines or networks, such as the Internet or dedicated communication lines.

Figure 2:
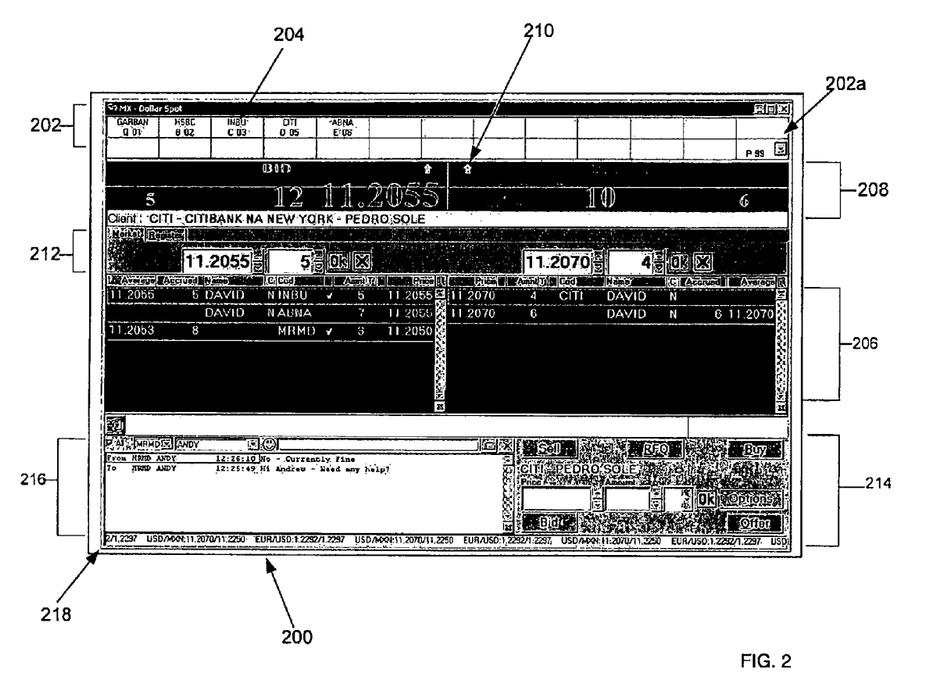
FIG. 2 depicts a preferred embodiment of an order-management user interface for use by a broker.

With reference to FIG. 2, there is shown a graphical user interface (GUI) 200 for use by brokers interacting with matching engine 102 via broker terminals 104b. As shown in FIG. 2, GUI 200 preferably comprises a selector window 202 comprising a plurality of selectable client buttons 204. Each client button 204 is preferably associated with a particular trader at a particular customer institution on whose behalf the broker is authorized to buy or sell financial instruments. In the representative example of FIG. 2, there are four client buttons shown, labeled HSBC, INBU, CITI, and ABNA. Selection of a client button 204 causes GUI 200 to shift to a client-perspective mode in which all actions and views are from the selected client's point of view. Thus, for example, in the representative example of FIG. 2, the client button for CITI (i.e., Citibank) is selected, and GUI 200 is tailored to provide the broker with functionality and information specific to Citibank and its market operations, as described below.

In a preferred embodiment, a broker may set a blank button in window 202 to a specific customer by double clicking on the blank button and then selecting an institution from a first drop down menu and, having selected the institution, selecting a particular trader at the institution from a second drop down menu. A window with finable fields is preferably provided which defaults to display information for the selected trader previously provided by the institution including the trader's contact information, settlement instructions and location for transmitting confirmations (e.g., an address, fax number, or SWIFT number). The broker may also preferably set the four letter code displayed on the customer button.

In a preferred embodiment, each client button 204 further displays two shortcut keystroke choices (e.g., D and 05 for Citibank). Entry of a keystroke choice for a customer causes GUI 200 to shift to the client-perspective mode for the selected client without requiring the broker to utilize his or her mouse to click on a button 204. These shortcut keystroke choices may be set by the user.

In a preferred embodiment, each broker's GUI 200 comprises a separate client button 204 for each client as to which the broker has primary responsibility. In addition, GUI 200 may further comprise a wildcard button labeled P99 with a drop-down menu that permits the broker to view a list of every client defined in the system. Selection of a particular client from the drop-down menu shifts GUI 200 into a client-perspective mode for the selected client. This functionality is useful, for example, when a broker must cover a client because the broker with primary responsibility for the client is not available. In a preferred embodiment, the system is programmed to include a transfer function that permits a broker to transfer his or her client buttons to another broker for coverage while the broker is not available. The transferred buttons will appear in selector window 202 of the other broker.

In a preferred embodiment, selector window 202 further comprises a broker button 202a. Selection of broker button 202a causes GUI 200 to shift to a client-neutral display in which market information is not displayed from the perspective of a particular client and in which the broker may enter orders in the market without specifying any particular client. This functionality facilitates the entry of "name pending" orders, an aspect of the present invention described in more detail below.

GUI 200 further preferably comprises a market-detail window 208 comprising a plurality of columns for displaying information concerning each pending bid and offer in the market. In particular, market-detail window 206 preferably comprises the following columns for each of the buy and sell sides of the market: "Price," which specifies the price of the order; "T," which specifies whether the order is an all or none order (i.e., an order that can only be hit or lifted for its entire size); "Amount," which specifies the size of the order; an unlabeled column, which specifies (by the presence or absence of a check mark) whether an order is tradeable by the currently-selected client; "Cod," which specifies the system code utilized to identify the identity of the client that submitted the order; "C," which specifies the client's location (e.g., N for New York); "Name," which specifies the name of the broker who entered the order (or is blank if the order was entered directly by a trader); "Accrued," which specifies the total quantity available to be transacted by the selected customer at all prices equal to or better than that specified for an order; and "Average," which specifies the overall or average price that a buyer or seller would pay for transacting the "accrued" size.

Thus, in the representative example of FIG. 2, if Citibank wished to simultaneously hit all the displayed bids at a price of 11.2050 or better, Citibank would sell only the "accrued" size of 8 although a total size of 15 is displayed on the bid side of the market because the second order at 11.2055 is not transactable by Citibank (e.g., as a result of a credit limit restriction). Similarly, in the representative example of FIG. 2, if Citibank wished to simultaneously lift all the displayed offers at a price of 11.2070 or better, Citibank would buy only the "accrued" size of 6 although a total size of 10 is displayed on the offer side of the market because the first order at 11.2070 is not transactable by Citibank since one cannot lift one's own offer.

In a preferred embodiment, the name of the broker that entered the order and the identity of the client that submitted the order are only displayed on the screens of brokers working at the same brokerage firm as the broker that submitted the order.

GUI 200 further preferably comprises a market-summary window 208 that displays the current best bid and best offer prices and the quantities available at those prices. Market-summary window 208 also preferably displays the portion of all available quantity that may be traded by the selected customer (Citibank in the representative example of FIG. 2). Arrows 210 are also provided to indicate whether the market is trading up or down.

GUI 200 further preferably comprises a first order-entry window 212 for entry of buy and sell orders by the broker for fast order entry or order editing. Order-entry window 212 comprises price fields for each of the buy and sell sides of the market that default to the current market price (11.2055-11.2070 in the representative example of FIG. 2) or, if the customer has a pending order, to the price of that order. Order-entry window 212 further preferably comprises quantity fields that default to the selected customer's default order size established by the broker or, if the customer has a pending order, to the size of that order. If the customer has more than one order, the window preferably defaults to the order closest to the market price. The broker may modify these default quantities if desired. Selection of an "OK" button will submit the shown order (whether new or edited), and selecting an "X" button will cancel the shown order (in the case where the shown order corresponds to a pending order of the selected customer).

GUI 200 further preferably comprises a second order-entry window 214 comprising price and quantity fields and a third field comprising a drop-down menu for selecting the order type (e.g., all or none). Using the "Options" button, the broker may specify whether the order is a fill and store (FaS) order, a fill and kill (FaK) order, or a fill or kill (FoK) order. Buttons are also provided to submit the order as an aggressive buy or sell, a passive bid or offer, or a request for quote (RFQ), which cannot itself transact but rather seeks to elicit an order from others in the market. In a preferred embodiment, when a client button 204 of GUI 200 is selected, all orders entered via first order-entry window 212 or second order-entry window 214 are automatically entered on behalf of the selected client (Citibank in the representative example of FIG. 2).

In a preferred embodiment, trade data is further organized through the use of color coding to identify order status. For example, the 11.2070 offer for 4M shown in FIG. 2 may be displayed in white to highlight that the order belongs to the selected client (i.e., Citibank). Color may also be used to indicate whether an order is tradeable by the selected client by, for example, highlighting the order in red for orders that are not tradeable (whether because of lack of credit, name-pending order where the customer is not willing to transact such orders (as explained below), or otherwise), and green for tradeable orders.

GUI 200 further preferably comprises a dialogue window 216 to facilitate messaging between the broker and other system users including traders. Dialogue window 216 comprises fields for selecting an entity, selecting the addressee of a message, and entering the message text. The entity and addressee fields preferably comprise drop-down menus. When the "All" field box is checked, the addressee drop-down menu preferably displays the names of all clients defined in the system. Otherwise, the addressee drop-down menu displays only the names of those clients for whom the broker has primary responsibility.

GUI 200 further preferably comprises a running ticker 218 displaying current market information of interest. In the representative example of FIG. 2, the ticker displays bid/offer spread information for currency pairs in the foreign exchange market.

It is noted that in the preferred embodiment shown in FIG. 2, the particular market displayed is that for Mexican Peso/U.S. Dollar exchange. A menu is preferably provided to permit substitution of other markets (e.g., Euros/U.S. Dollars) in windows 206, 208 to permit fast shifting from market to market. Alternatively, the broker may open multiple windows analogous to that shown in FIG. 2, for each desired market.

Figure 3:
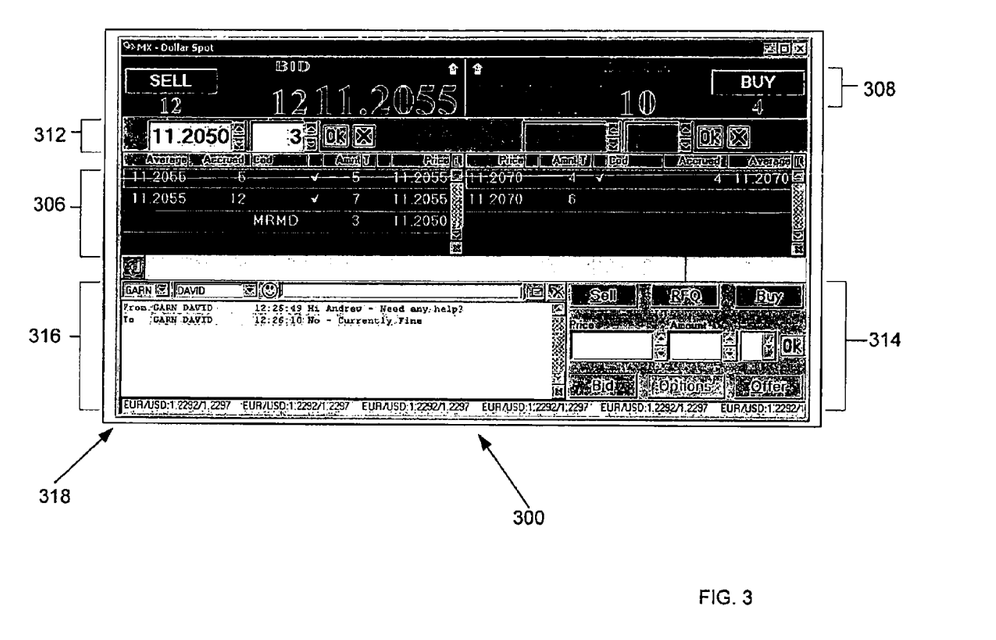
FIG. 3 depicts a preferred embodiment of an order-management user interface for use by a trader.
Figure 4:
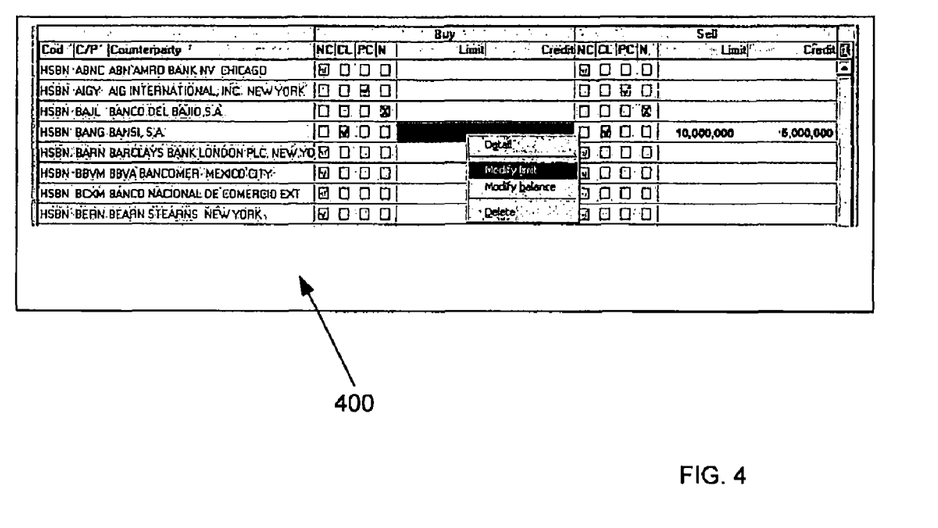
FIG. 4 depicts a preferred embodiment of a credit-preferences user interface for use by a broker or trader.

With reference to FIG. 3, there is shown a preferred embodiment of a GUI 300 for use by traders interacting with matching engine 102 via terminals 104*a*. As shown in FIG. 4, GUI 300 preferably comprises a market-detail window 306, a market-summary window 308, a first order-entry window 312, a second order-entry window 314, and a dialogue window 316, analogous to those described above in connection with GUI 200. GUI 300, however, differs from GUI 200 in that it does not comprise an analog to selector window 202 and does not display certain information in market-detail window 406 that is displayed in market-detail window 206 of GUI 200. In particular, market-detail window 306 does not identify the source of bids or offers submitted by other institutions and does not identify the name of the broker that entered a bid or offer. It should also be noted that in the user interface of FIG. 3, where the customer does not have an order on a particular side of the market, window 312 is not initially populated with information until the customer clicks "OK" to remind the customer that it does not currently have an order on that side of the market and to encourage the customer to utilize order entry window 314 to initially enter its first order.

FIG. 4 depicts a preferred embodiment of a GUT 400 adapted for use by a broker or a client to establish credit preferences for the client. As shown in FIG. 4, GUI 400 preferably comprises the following columns for organizing credit preference data: "Cod," which identifies the entity for which credit limits are being established; "C/P" and "Counterparty," which respectively display an abbreviation and full name of each potential counterparty; and two sets of columns for separately setting credit preferences with respect to buy and sell transactions. In particular, for each potential counterparty and each type of transaction (i.e., buy or sell), the broker or client may select from the following choices: Name Check ("NC"), indicating that the client will need to separately approve each transaction with that counterparty when a match occurs; Credit Line ("CL"), indicating that the client wishes to set a dollar (or other currency) limit on credit to be allowed the counterparty (when CL is selected a credit-line size is entered by the broker or client in the field provided); Pre-Cleared ("PC") where the client wishes to allow unlimited credit with the counterparty; and None ("N"), where the user does not wish to extend any credit to a counterparty.

Figure 5:
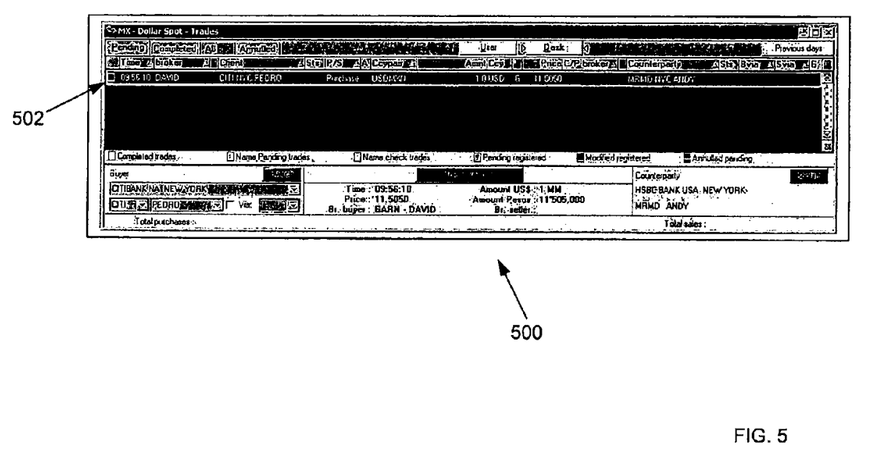
FIGS. 5-7 depict a preferred embodiment of a user interface adapted for entry and management of post-trade data by a broker.

FIG. 5 depicts a preferred embodiment of a GUI 500 adapted for use by brokers to enter and manage post-trade data. In this context, the term post-trade is used to refer to the period after a buy and sell order are matched, even if there remain additional steps that must be performed by one or both parties to complete the transaction. GUI 500 will also be referred to herein as the "blotter." In a preferred embodiment, an analogous user interface to that shown in FIG. 5 may be provided to customers except that such interface would not comprise a "switch" button (described below) since the functionality performed by that button is not available to customers.

GUI 500 preferably permits the broker to select from four distinct views entitled: (1) "Pending," which displays pending trades, i.e., matched trades that are not yet completed and require further action by some party; (2) "Completed," which displays all completed trades for a given trade date; (3) "All," which displays all pending and completed trades; and (4) "Annulled," which shows any trade that has been canceled. Thus, a record even of canceled trades is maintained by the system. The user may navigate from view to view within the blotter using the labeled tabs provided.

Each selectable view of GUI 500 preferably comprises the following columns: "Time," which specifies the time of the trade; "Broker," which displays the name of the broker that acted on behalf of the client; "Client," which indicates the name of the client on whose behalf the trade was executed; "P/S," which identifies whether the trade was a buy or a sell; "A," which displays the source or location of the item; "Ccy-pair," which specifies the traded instrument (a currency pair in the representative example of FIG. 5); "Amt," which identifies the size of the trade; "Ccy," which indicates the currency in which the size is expressed; an unlabeled column that indicates whether the broker's client was passive or aggressive in the transaction (represented by "G" for given and "T" for taken); "Price," which specifies the price at which the instrument traded; "C/P broker," which displays the name of the counterparty broker (left blank if the counterparty did not use a broker); "Counterparty," which specifies the counterparty to the transaction; and "Bvia" (i.e., bought via) and "Svia" (i.e., sold via), which identify the third party broker via whom the instrument was bought or sold in a case where the identity of the ultimate counterparty to the transaction is not disclosed to the broker.

In a preferred embodiment, when a broker or trader hits a bid or lifts an offer, matching engine 102 determines whether any further actions are required to complete the trade, e.g., whether circumstances require the party that submitted the pending bid or offer to approve the party that submitted the matching order before the trade may execute, setting the spot rate in a foreign exchange trade, duration in a bond swap trade, treasury price in an interest rate swap, LIBOR rate in an interest rate swap. If no further action is required, the match is processed directly to the completed state and added to the "Completed" view of both parties to the transaction and their respective brokers. Otherwise, if any further action is required to complete the trade, the trade is added to the "Pending" view of both parties to the transaction and their respective brokers. As described in more detail below, the present invention preferably supports a number of different types of pending transactions, including: name-check transactions, name-pending transactions, modified-registered transactions, and annulled-registered transactions.

In a preferred embodiment, the status of each trade displayed via GUI 500 may be further indicated using color coding or other identifiers. For example, completed trades may be identified in white, name-pending trades in pink, name-check trades in yellow, pending trades where further action is required to complete the trade in orange, modified-registered trades in green, and annulled-pending trades in red. In a preferred embodiment, each customer may notify the broker whether or not it is willing to participate in name-pending trades. Where a customer has declined to participate in such trades, name-pending trades preferably are displayed in GUI 500 in red rather than pink. In a further preferred embodiment, the system may specify what action is required by the user by providing an action button 502 to the immediate left of the trade data. This action button may also be color coordinated to indicate which party must perform the required further action (e.g., red if the counterparty is to perform the action and green if the party is to perform the action).

The representative example of FIG. 5 illustrates how GUI 500 may be utilized to reject or confirm a pending name-check transaction, i.e., where two orders have been matched but at least one of the parties to the transaction has selected name check as the credit status of the proposed counterparty. This screen enables the user, within a period of time after the trade when the parties' names are released to each other, to either approve or reject the counterparty using the "reject pending" button in the center bottom of the screen or the "confirm" button in the lower right of the screen. The name check function will now be further described by reference to an example.

Example 1

Trader A has set his credit preference to require a name check for all transactions with Trader B. Trader B hits a bid of Trader A. Once the trade is entered in the system, the trade is designated as a pending trade because it requires Trader A to confirm that Trader B is an acceptable counterparty to the trade.

Step: 1: Trader A selects the "Pending" tab from his GUI 500. At the Pending screen, all pending transactions for Trader A are displayed. The transaction is preferably designated by a particular color associated with name check transactions.

Step 2: Trader A selects the transaction and the lower portion of GUI 500 is populated with counterparty information as well as other relevant transaction information (e.g., the time the transaction was entered, price, and the amount) and the "reject pending" or "confirm" buttons are activated and become selectable.

Step 3: Trader A (or Trader A's broker) approves Trader B as the counterparty by selecting the confirm button.

Step 4: Assuming that there are no other actions required by Trader A or Trader B the transaction is processed and moves from the pending state to completed and added to the completed view of both parties' blotters.

The concept of "name pending" allows a broker to efficiently enter orders by permitting the broker to enter an order without initially specifying a client name (i.e., only having to submit price and quantity) with the understanding that the broker will later (typically within some specified short period of time) provide a suitable counterparty to the dealer with whom he or she traded. The purpose of the name pending function is to enhance the speed at which brokers can operate and to allow trades to proceed where credit may initially be a problem. Using the name pending function, the broker enters an order into the market by simply submitting a price and quantity, just as a dealer would in entering an order directly into the system. In a preferred embodiment, because not all traders will be willing to enter into a trade with an unnamed party, each trader may establish in their preferences whether or not they will trade name-pending orders.

Figure 6:
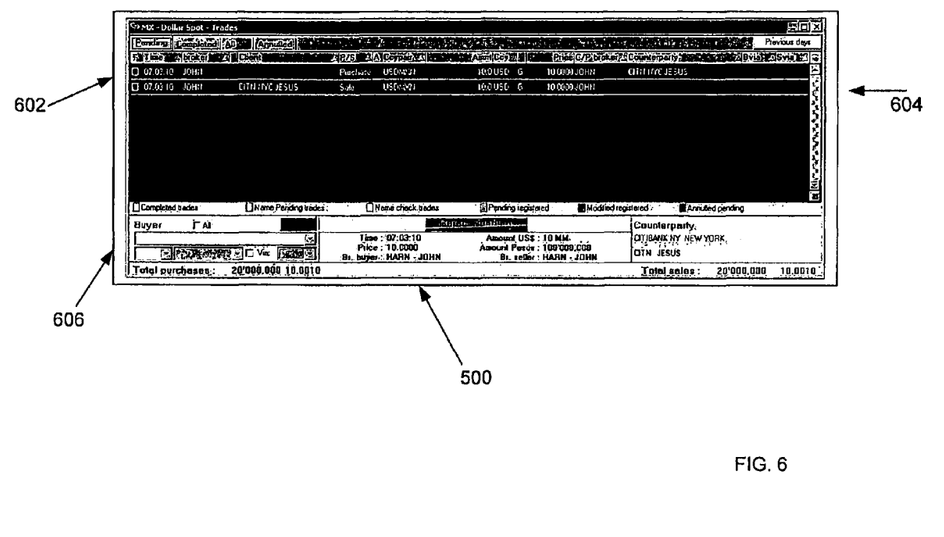

Use of GUI 500 to complete a name-pending transaction will now be described in connection with FIG. 6. As shown in FIG. 6, GUI 500 displays each transaction using two rows 602, 604 referred to as a pending-trade pair. In the representative example of FIG. 6, row 602 represents the buy side of the transaction and row 604 represents the sell side of the transaction. The broker, John, has executed both sides of the trade himself in this example. On one side of the trade the broker has entered a sell on behalf of a specified trader (CITN). The buyer, however, has been entered as name pending and the client field in row 602 and counterparty field in row 604 are accordingly blank. In the lower left side of the screen there is provided a drop-down menu 606 that allows the broker to quickly select a counterparty which is then used to populate the blank client and counterparty fields in rows 602, 604. The trade may then progress to the completed state if no additional action is required, or remain pending if some other step (e.g., a name check) is required to complete the trade as a result of the newly specified counterparty. The name pending function will now be further described by reference to an example.

Example 2

Pending in the market is a bid for 4M at 10 entered by Broker A on behalf of its client Dealer J. Broker A then receives an order from Dealer K to hit Dealer J's pending bid.

Step 1: With the broker button 206 of GUI 200 selected, Broker A hits Dealer J's pending bid. Because it is a name-pending transaction Broker A is not required to enter a client name to trigger the transaction. The resulting trade is J buying 4M at 10 from Name Pending.

Step 2: The system processes the transaction as a pending transaction because the buyer side of the transaction has not been identified, and a pending-trade pair is added to the "Pending" view of Broker A's blotter.

Step 3: Broker A navigates to the "Pending" view of the blotter. Broker A selects K as the second party in the transaction from drop-down menu 606, and the transaction is completed.

It should be noted that use of GUI 200 in client-neutral display mode to provide name pending functionality may find particular application where the interface is being used by an order-entry person on the floor of a brokerage firm who is entering orders that he or she hears shouted on the floor by other brokers. In such a case, the order-entry person is generally able to ascertain the name of the broker who shouted out an order but may not be able to immediately determine the name of the client represented by the broker or may not wish to delay entry of the order to enter the client name.

In a further preferred embodiment, the system may leverage the system's name-pending functionality to incorporate the concept of a "name switch." A "Switch" button may be provided for this purpose. The name-switch function will now be further described with reference to an example.

Example 3

There are three traders A, B, and C. Trader A has a credit line with Trader B but not Trader C. Trader B has credit lines with both Trader A and Trader C. Trader C has a credit line with Trader B but not Trader A. A wishes to buy and Trader C wishes to sell, however, the above credit preferences will not allow this transaction to be completed. The broker can arrange a switch by inserting Trader B into the trade, as follows:

Step 1: Trader A enters a bid at 10.0500 for 2M.

Step 2: Broker trades with Trader A using the "name pending" function. The resulting trade is Trader A buying 2M at 10.0500 from name pending. This trade would appear in Trader A's blotter and the Broker's blotter.

Step 3: The Broker "switches" the name-pending trade in his blotter by selecting two parties using drop-down menu 606 of GUI 500. The first would be the final counterparty (which here is C), and the second would be the "switch" counterparty. When the broker selects the "Switch" button, automatically generates two trades, Trade 1 where Trader A buys 2 at 10.0500 from Trader B and Trade 2 where Trader B buys 2 at 10.0500 from Trader C. The result is B has no net position having sold to Trader A and bought from Trader C.

The modified-registered functionality of the present system provides a mechanism by which traders may modify a previously completed trade, for example to increase the trade size. When one party indicates that it wishes to initiate a pending modified-registered trade, a new row including details concerning the proposed trade modification are added to the blotter of each counterparty. The second party to the trade may then determine whether it wishes to agree to the proposed modification, in which case the completed trade view of each party's blotter is updated to reflect the modified trade. The modified-registered function will now be further described with reference to an example.

Example 4

Broker A, acting on behalf of Dealer X, has completed a trade with Dealer Y for 3M at 11.2075. Broker A, acting again on behalf of Dealer X, however, wishes to decrease the size of the trade from 3 mm to 2 mm.

Step 1: Broker A selects the trade he would like to change from the completed transactions screen and changes the size of the trade from 3 mm to 2 mm. All other trade details are unchanged.

Step 2: The trade appears on the pending screen of both Broker A and Dealer X, and is indicated as a modified-registered trade by color or other appropriate indicator.

Step 3: Dealer X accesses the pending screen on his or her blotter and selects the modified-registered trade. Dealer X changes the size of the trade from 3 mm to 2 mm.

Step 4: The system updates the completed trade entry in the blotters of both Broker A and Dealer X to reflect the new agreed-to trade terms.

The annulled-pending functionality of the present system provides a mechanism by which one party may request that a previously completed transaction be cancelled. Both parties must agree to cancellation before a completed trade will be annulled. The annulled-pending functionality will now be further described with reference to an example.

Example 5

Broker A, acting on behalf of Dealer X, completes a trade with Broker B, acting on behalf of Dealer Y, for 5M at 10.0555. Broker B wishes to cancel the trade.

Step 1: Broker B selects the trade he would like to cancel from the completed transactions screen and selects the cancel button.

Step 2: The trade appears on the pending screen of both Broker A and Broker B and is indicated as an annulled pending trade by color or other appropriate indicator.

Step 3: Broker A accesses the pending screen on his blotter and selects the trade with Broker B. Broker A cancels the trade.

Step 4: The system processes the trade as an annulled trade and transfers the trade to the annulled screen of each party's blotter.

Figure 7:
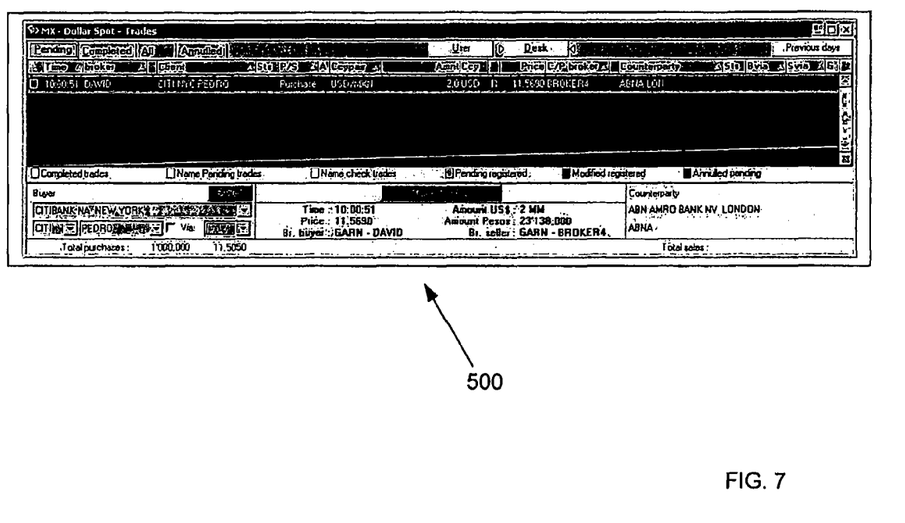

FIG. 7 depicts a preferred embodiment of a screen presented to a user when the user has entered a trade that was completed offline (i.e., the buy and sell orders were not matched by the electronic trading system). This trade is waiting for the person, broker or trader, that represents the other side of the transaction to enter the equal and opposite trade (the matching trade pair). The matching trade may be missing from the screen because the counter-party has not yet entered its trade data or because the parties have not entered matching trade data. In an alternative embodiment, the screen may also provide some information as to why the record has not been completed. For example, a message may be provided that there is no trade to match in the system or that there is no match as to the price, quantity, or particular financial instrument. If one party to the trade has accurately entered the transaction information, the trade may immediately be moved to the completed trade section of the blotter as soon as the second party to the transaction completes entry of matching trade information.

This order-match function will now be further described with reference to an example.

Example 6

Broker A on behalf of his client J agrees in a voice transaction with Broker B to sell 4M at 10 to client K, a client of Broker B.

Step 1: Broker A accesses the system to enter the transaction data. Broker A enters the following data for his transaction with Broker B: K sold 5M at 10 to J (i.e., Broker A has mistakenly entered incorrect data regarding the transaction that occurred). A transaction row is added to Broker A's blotter with this information.

Step 2: The transactions is listed on Broker A's GUI as a pending trade as the system cannot identify a matching transaction because Broker B has not yet entered the transaction data.

Step 3: Broker B accesses the system after Broker A and enters the following data for the transaction: K sold 4 mm at 10 to J (i.e., Broker B has correctly entered the trade). A transaction row is added to Broker B's blotter with this information.

Step 4: The system processes the information entered by Broker B and attempts to match the transaction with other entries entered into the system. Not finding an entry that completely matches, the system will identify the transaction as pending and send a message to Broker B that there is no match as to quantity. The transaction will remain in the pending state until both brokers have modified their respective trade entries to recite the same transaction data, in which case the trade is deemed completed and removed from the blotter's pending view.

In a preferred embodiment, traders and brokers may be provided with appropriate corresponding order-entry and blotter GUI's that display corresponding information in analogous views to facilitate discussion between broker and trader regarding the state of the trader's market operations.

While the present invention has been described in conjunction with specific embodiments, it is evident that numerous alternatives, modifications, and variations will be apparent to those skilled in the art in view of the foregoing description.

What is claimed is:

1. A computerized order management system comprising:
    a display device having a user interface for facilitating post-trade processing by a user, the user interface comprising:
    a pending view for displaying those trades that require further action by the user to be completed; and
    a completed view displaying those trades that are completed, wherein
    the user interface is adapted to support name-pending transactions in which the user may enter an order without initially specifying a client name and then subsequently specify the client name,
    to support name switch transactions in which the user may, following commencement of a trade, substitute the name of a first party for a second party in the trade where the first party has a credit line with the counter-party to the trade and the second party, and the second party does not have a credit line with the counter-party to the trade, and
    to support name-check transactions wherein a buy and sell order are matched, but at least one party to the transaction must approve its proposed counterparty before the transaction can be completed.

2. The system of claim 1, further comprising an annulled view for displaying trades that have been cancelled.

3. The system of claim 1, further comprising an all view for displaying all pending, completed and annulled trades.

4. The system of claim 1, further adapted to support modified-registered transactions in which a user indicates a desire to modify some aspect of a completed transaction.

5. The system of claim 1, further adapted to support annulled-pending transactions in which a user indicates a desire to cancel a completed transaction.

6. The system of claim 1, further comprising reject or confirm buttons through which a user may accept or reject the proposed counterparty.

7. The system of claim 1, further adapted to organize transaction data through the use of color coding to identify the status of a transaction as completed or pending.

8. The system of claim 1, further adapted to provide a field at the pending trades display area to indicate whether the trade requires the user to perform a further action to complete the trade.

9. The system of claim 8, wherein the field displays distinct indications for actions to be performed by the user and actions to be performed by the user's counterparty.

10. A computerized order management system comprising:
    a display device having a user interface for facilitating integrated post-trade processing by a user at a single screen without requiring a plurality of pop-up windows, the user interface comprising:
    a pending view for displaying those trades that require further action by the user to be completed; and
    a completed view displaying those trades that are completed, wherein
    the pending view includes name-pending transactions in which the user may enter an order without initially specifying a client name and then subsequently specify the client name,
    the user interface is adapted to support name switch transactions in which the user may, following commencement of a trade, substitute the name of a first party for a second party in the trade where the first party has a credit line with the counter-party to the trade and the second party, and the second party does not have a credit line with the counter-party to the trade, and
    said pending view includes name-check transactions wherein a buy and sell order are matched, but at least one party to the transaction must approve its proposed counterparty before the transaction can be completed.

11. The system of claim 10, wherein said pending view includes modified-registered transactions in which a user indicates a desire to modify some aspect of a completed transaction.

12. The system of claim 10, wherein said pending view includes annulled-pending transactions in which a user indicates a desire to cancel a completed transaction.

13. The system of claim 10, wherein said pending view includes pending registered transactions in which user has entered a trade that was completed offline and is waiting for the person that represents the other side of the transaction to enter the opposite trade.

* * * * *